S. A. PRITCHARD.
THROTTLE CONTROLLER FOR AUTOMOBILES.
APPLICATION FILED DEC. 7, 1915.
1,228,244.
Patented May 29, 1917.
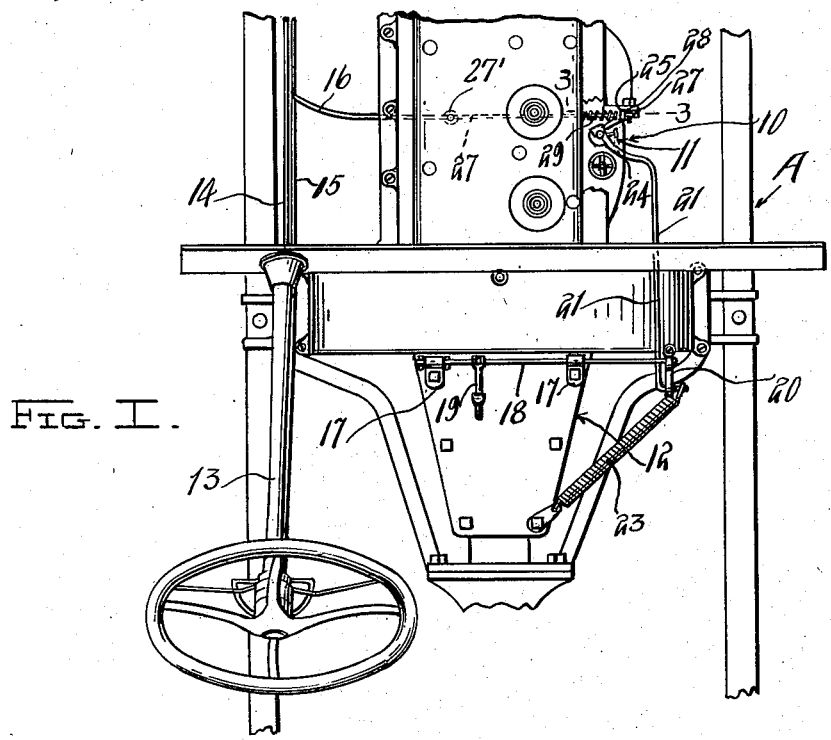
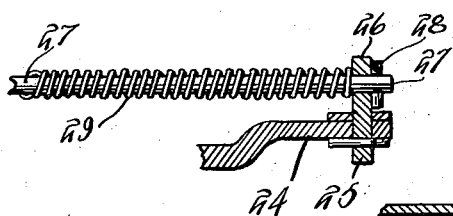
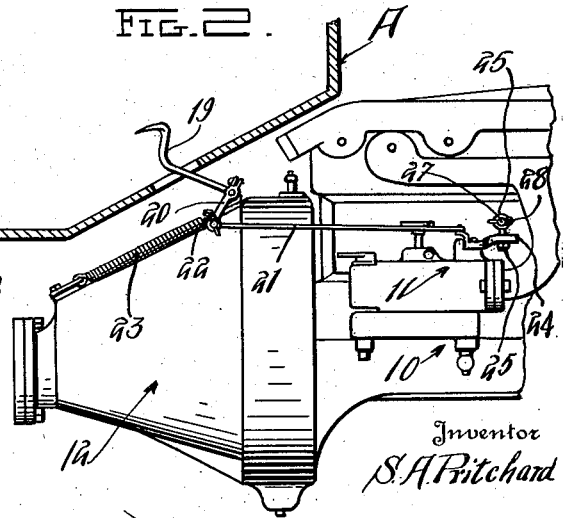
Inventor
S. A. Pritchard

UNITED STATES PATENT OFFICE.

SAMUEL ALBERT PRITCHARD, OF VAN METER, IOWA.

THROTTLE-CONTROLLER FOR AUTOMOBILES.

1,228,244.  Specification of Letters Patent.  Patented May 29, 1917.

Application filed December 7, 1915. Serial No. 65,628.

*To all whom it may concern:*

Be it known that I, SAMUEL A. PRITCHARD, a citizen of the United States, residing at Van Meter, in the county of Dallas, State of Iowa, have invented certain new and useful Improvements in Throttle-Controllers for Automobiles; and I do hereby declare the following to be a full, clear, and exact description of the invention, such as will enable others skilled in the art to which it appertains to make and use the same.

This invention relates to a throttle controller for automobiles and particularly to a controller that can be operated either by foot power or by hand power.

The object of the invention is to provide a throttle controller having an improved construction embodying simplicity, efficiency, low cost of manufacture, and which can be easily associated with standard automobiles and particularly a Ford automobile.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a fragment of an automobile showing the improved throttle controller applied;

Fig. 2, a side view of what is shown in Fig. 1; and

Fig. 3, a section on the line 3—3 of Fig. 1.

Referring to the drawings A indicates generally an automobile which includes the usual motor 10, carbureter 11, transmission casing 12, steering column 13, steering shaft 14, and hand operated throttle controlling shaft 15 mounted on the steering column 13 and provided with the usual arm 16.

The improved throttle controller embodies spaced bearings 17 mounted upon the transmission case 12 and having rotatably mounted therein an operating shaft 18 having fixed thereon a pedal lever 19 so positioned as to be readily actuated by the foot of the driver when desired. One end of the shaft 18 has fixed thereon an arm 20 and pivotally connected to the free end of the arm 20 is one end of a link 21, a cotter pin 22 being utilized to prevent disengagement of the link 21 from the arm 20. Secured to the cotter pin 22 is one end of a spring 23, the other end of which is secured to the transmission casing 12. This spring 23 serves to normally hold the throttle of the carbureter 11 in closed position, said throttle, of the carbureter embodying the bell crank throttle lever 24. The end of the link 21 remote from the arm 20 is pivotally connected to one end of the lever 24. A pivot pin 25 having an eye head 26 is mounted in the other end of the lever 24 and in said eye is slidably engaged a rod 27. The end of the rod 27 remote from the lever 24 is pivotally connected to the arm 16 at 27' in any suitable manner for actuation by rotation of the shaft 15 to operate the throttle of the carbureter 11 to open position. Sliding movement of the rod 27 when opening the throttle of the carbureter is limited by a cotter pin 28 engaging the head 26. Encircling the rod 27 and having one end fixed to said rod and its other end bearing against the head 26 is a spring 29 which assists in returning the parts to their normal position as will be obvious.

In operation of the device it will be apparent that when the pedal lever 19 is pressed down with the foot the shaft 18 will be rotated and this rotation of said shaft will be transmitted through the link 21 to the throttle lever 24 to impart opening movement to the latter. During this opening movement of the lever 24 the pivot pin 25 will slide along the rod 27 against the influence of the spring 29 so that said rod 27 will not interfere with the foot operation of the device.

What is claimed is:—

In an automobile the combination of a motor, a carbureter including a throttle lever, a transmission casing, a steering column, a handle throttle shaft mounted on the steering column, an arm on said shaft, a shaft rotatably mounted on the transmission casing, a foot lever fixed to the second shaft, an arm on the second shaft, a spring connecting said arm to the transmission casing, a link having one end connected to the arm on the second shaft and at its other end connected to the throttle lever, a pivot pin carried by the throttle lever, said pivot pin including an eye head, a rod having one end slidably engaged in the eye head and its other end connected to the arm on the first named shaft, a spring encircling said rod and having one end fixed thereto and its other end bearing against the eye head, and means for limiting sliding movement of the rod in one direction with respect to the eye head.

In testimony whereof, I affix my signature, in the presence of two witnesses.

SAM. ALBERT PRITCHARD.

Witnesses:
OTTO VAN DEN BERG,
WALTER G. WEHRKAMP.